United States Patent [19]
Shimoda

[11] Patent Number: 5,458,429
[45] Date of Patent: Oct. 17, 1995

[54] SECURING STRUCTURE FOR A STAND OF KEYED INSTRUMENT

[75] Inventor: Yoshiaki Shimoda, Hamamatsu, Japan

[73] Assignee: Kabushiki Kaisha Kawai Gakki Seisakusho, Shizuoka, Japan

[21] Appl. No.: 294,875

[22] Filed: Aug. 23, 1994

Related U.S. Application Data

[63] Continuation of Ser. No. 17,186, Feb. 12, 1993, abandoned.

[30] Foreign Application Priority Data

Mar. 31, 1992 [JP] Japan .................. 4-026540 U

[51] Int. Cl.$^6$ ..................................... F16B 12/10
[52] U.S. Cl. ............................. 403/258; 403/260
[58] Field of Search ..................... 403/258, 260, 403/256–257, 264, 252, 231, 407.1, 259, 247, 245, 230, 232.1; 108/180, 153; 211/175, 182

[56] References Cited

U.S. PATENT DOCUMENTS

| | | | |
|---|---|---|---|
| 1,346,518 | 7/1920 | Waggoner | 403/258 X |
| 3,271,056 | 9/1966 | Frisbey, Jr. | 403/260 X |
| 3,329,383 | 7/1967 | Pilliod et al. | 403/231 X |
| 4,030,846 | 6/1977 | Flötotto | 403/231 |
| 4,896,778 | 1/1990 | Ferdinand et al. | 403/260 X |

FOREIGN PATENT DOCUMENTS

| | | | |
|---|---|---|---|
| 2901932 | 7/1980 | Germany | 403/231 |
| 657257 | 9/1951 | United Kingdom | 403/260 |
| 1148687 | 4/1969 | United Kingdom | 403/258 |

Primary Examiner—Randolph A. Reese
Assistant Examiner—Harry C. Kim
Attorney, Agent, or Firm—Evenson, McKeown, Edwards & Lenahan

[57] ABSTRACT

A securing structure for a stand of keyed instrument having a pair of side plates supporting a main body of the keyed instrument and a back plate spanned between the side plates and reinforcing them, the side plate and the back plate are interconnected by a screw through a securing plate with one end face of the back plate being abutted against a side face of the back plate being abutted against a side face of the side plate, the side plate has, at the side face thereof, a through aperture through which the screw can pass, the back plate has, at the end face thereof, an insert aperture corresponding to the through aperture, and at the side face thereof, a communicated aperture communicating with the insert aperture in a substantially octagonal direction relative to the insert aperture, the securing plate has a securing portion loosely inserted into the communicated aperture and having a threaded hole aligned with the insert aperture when the securing portion is inserted into the communicated aperture, and an abutment portion formed integrally with the securing portion and adapted to abut against the side face of the back plate for limiting the insert depth of the securing portion into the communicated aperture.

2 Claims, 5 Drawing Sheets

SECURING STRUCTURE FOR A STAND OF KEYED INSTRUMENT

This application is a continuation of U.S. application Ser. No. 08/017,186 filed Feb. 12, 1993 now abandoned.

BACKGROUND OF THE INVENTION

Field of the invention

The present invention relates to a securing structure of a stand for forming legs of a keyed instrument such as an electronic piano.

As shown in FIGS. 6 through 8, a stand of this type in the prior art has a pair of side plates 114 and 114 supporting a main body of the keyed instrument, and a back plate 115 secured between the side plates 114 and 114 and reinforcing them. A base 116 is secured to the bottom end of each side plate 114 and a pedal board 118 is arranged between the bases 116 and 116.

A securing structure shown in FIG. 6 uses round nuts 151. The round nuts 151 are inserted into a pair of apertures 152 and 152 formed in the rear face of the back plate 115. Screws 155 are passed through a pair of screw apertures 153 and 153 formed at the end face of the back plate 115 and through a pair of through apertures 154 and 154. The back plate 115 and the side plate 114 are secured together by the screws 155 and the round nuts 151.

Securing structures shown in FIGS. 7 and 8 each uses a L-shaped fitting 156. In the structure of FIG. 7, the back plate 115 and the side plate 114 are mutually secured by firstly securing one side of the L-shaped fitting 156 to the side plate 114 by screws, and then fastening screws 158 through apertures 157 formed in the back plate 115 into threaded apertures formed in the other side of the L-shaped fitting 156. On the other hand, in the structure of FIG. 8, the back plate 115 and the side plate 114 are mutually secured by firstly securing one side of the L-shaped fitting 156 to the back plate 115 by screws, and then fastening screws 160 through apertures 159 formed in the side plate 114 into threaded apertures formed in the other side of the L-shaped fitting 156.

However since both the securing structure of FIGS. 7 and 8 are so constructed that the back plate 115 is fastened through the L-shaped fitting 156 in a direction crossing a direction aproaching toward each other, there is formed with a gap between the side plate 114 and the back plate 115 which causes looseness therebetween, and accordingly it is impossible to firmly secure them together.

In the securing structure of FIG. 6, the back plate 115 is directly abutted against the side plate 114 and they are fastened toward each other and therefore the problems caused by the structures of FIGS. 7 and 8 are overcome. However since the round nuts 151 are liable to rotate or slide in longitudinal direction in their apertures 152, it is troublesome to align the through apertures 154 and the round nuts 151, and difficult to assemble them.

SUMMARY OF THE INVENTION

It is therefore an object of the present invention to overcome the problems of the prior art mentioned above and to provide a securing structure of stand for a keyed instrument which is easy to assemble and can firmly secure the back plate to the side plates.

According to the present invention, the object mentioned above is achieved by a securing structure for a stand of keyed instrument having a pair of side plates supporting a main body of the keyed instrument and a back plate spanned between the side plates and reinforcing them, the side plate and the back plate are interconnected by screw (or screws) through a securing member with one end face of either the side plate or the back plate being abutted against one side face of the other of the side plate or the back plate wherein either one of the side plate or the back plate has, at the side face thereof, a through aperture (or apertures) through which said screw (or screws) can passes, the other of the side plate or the back plate has, at the end face therof, an insert aperture (or apertures) corresponding to the through aperture (or apertures), and at the side face thereof, a communicated aperture (or apertures) communicating with said insert aperture (or apertures) in an substantially orthogonal direction relative to the insert aperture, said securing member has a securing portion having internal thread (or threads) and an abutment surface formed integrally with the securing portion and adapted to abut against the side face of either one plate for positioning the internal thread (or threads) and the insert aperture (or apertures) when the securing member is inserted into the communicated aperture (or apertures).

The abutting surface of the securing member abuts against the external surface of the back plate when the securing portion is inserted into the communicated apertures and thus positions the internal threads formed in the securing portion relative to the insert apertures. The side plate and the back plate are fastened with approaching toward each other and firmly abutted with each other by threading screws into the internal threads in the securing member.

DESCRIPTION OF THE PREFERRED EMBODIMENT

A preferred embodiment of the present invention will be hereinafter described with reference to the accompanying drawings.

Figure 1:
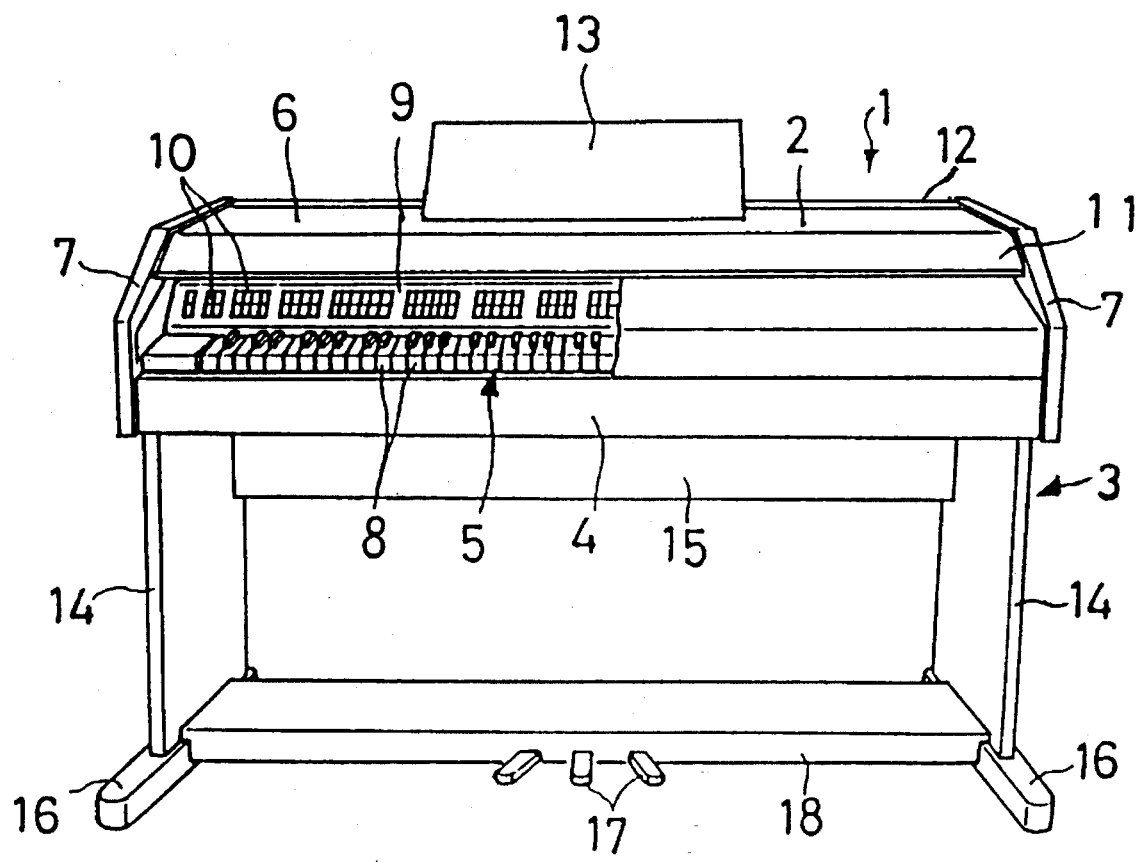
FIG. 1 is a perspective view showing an electronic piano to which the present invention is applied.

There is shown in FIG. 1 an external appearance of an electronic piano 1 into which a stand structure of the present invention is incorporated and which comprises a main body 2 of piano, and a stand 3 for supporting the main body 2. The main body 2 has a keyboard section 5 and a device section 6 arranged before and behind of a bottom plate 4 attached to the stand 3 ("before" and "behind" used herein mean respectively "proximal" to and "distal" from a player), and also has a pair of arm members 7 and 7 arranged with sandwiching the keyboard section 5 and the device section 6 therebetween.

The keyboard section 5 has a keyboard 8, and a control panel 9 arranged behind the keyboard 8 in which many kinds of control switches 10 are arranged. The device section 6 has a top plate 11 and a rear plate 12. An acoustic device and the like (not shown) are contained in a space defined by the top, rear and bottom plates 11, 12 and 4. A music stand 13 is mounted on the top of the top plate 11.

The stand 3 comprises a pair of side plates 14 and 14 supporting the main body 2 and a back plate 15 arranged between upper portions of the side plates 14 and 14 for reinforcing them. A base 16 is secured on the bottom end of each side plate 14 and a pedal board 18 on which pedals 17 are mounted is arranged between the bases 16 and 16.

Figure 2:
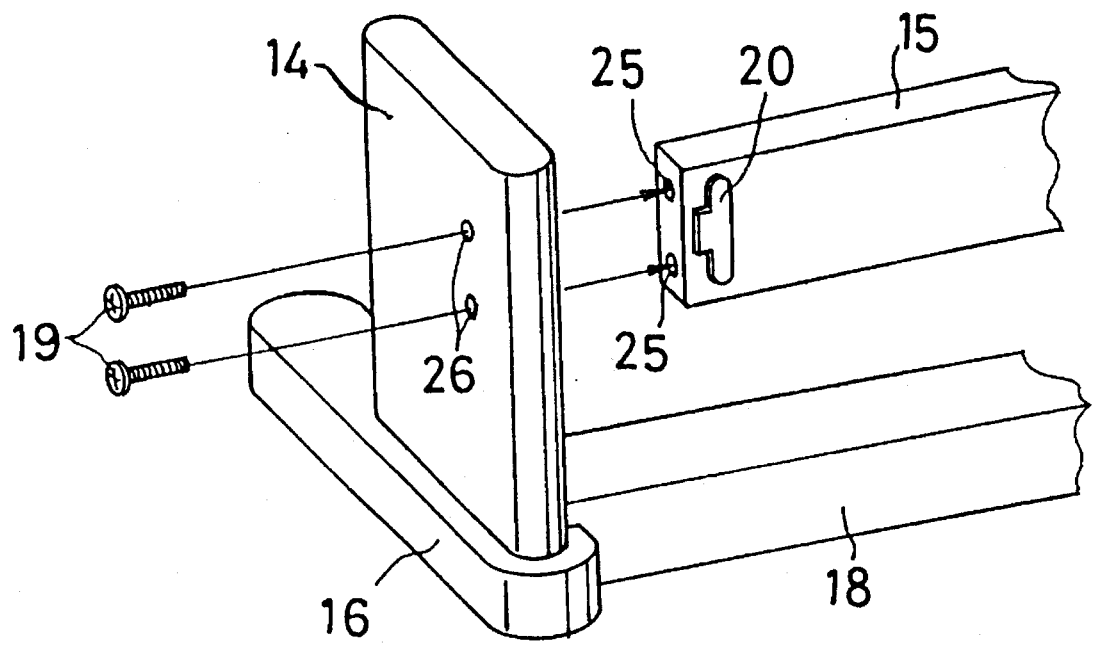
FIG. 2 is an exploded perspective view of the stand of electronic piano of FIG. 1 viewed from the back thereof.
Figure 3:
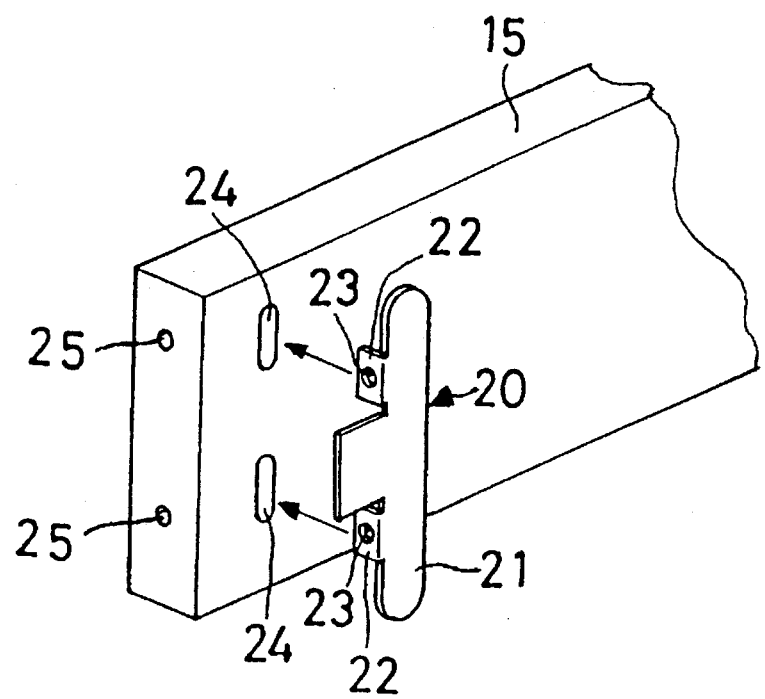
FIG. 3 is a detailed perspective view of the securing member of FIG. 2.
Figure 4:
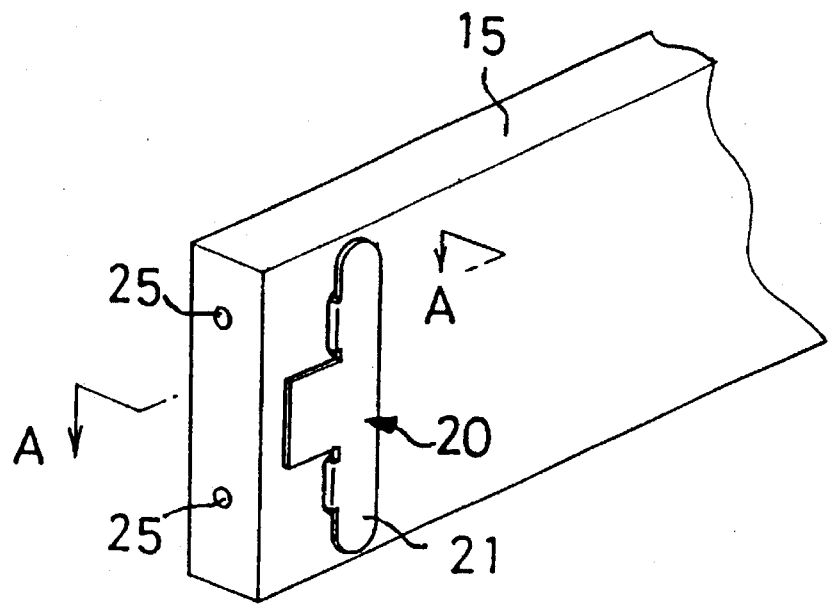
FIG. 4 is a perspective view of the securing member attached to the back plate.

Then a structure of a securing structure of the stand 3, that is, a structure for securing the back plate 15 to the side plate 14 will be explained with reference to FIGS. 2 through 5. As shown in FIG. 2, in the securing structure of the present embodiment, the back plate 15 is secured to the side plate 14 with the end face of the back plate 15 abutting against the inside surface of the side plate 14 using screws 19 and a back plate fitting (securing member) 20. As shown in FIG. 3, the back plate fitting 20 has a main body portion 21 having substantially T-shaped configuration, and a pair of plate-like securing portions 22 and 22 perpendicular to the main body 21, each securing portion 22, at the center thereof, is formed with internal thread 23 to which the screws 19 are threaded.

On the other hand, the rear face of the back plate 15 is formed, near the ends thereof, with a pair of elongated apertures (communicated aperture) 24 and 24 which are vertically aligned. These elongated apertures 24 extend perpendicularly to the rear face of the back plate 15 and terminate just short of the front face thereof to define blind apertures. Formed at the end face of the back plate 15 are a pair of screw apertures (insert apertures) 25 and 25 into which screws 19 and 19 are inserted and which extend along a length of the back plate 15 to communicate with the elongated apertures 24. The internal threads 23 are so positioned that they align with the insert apertures 25 when the securing portions 22 are inserted into the elongated apertures 24. In FIG. 2, reference numbers 26 and 26 are a pair of through screw apertures (through aperures) which are formed in the side plate 14 at positions corresponding to the insert apertures 25 and 25.

Figure 5:
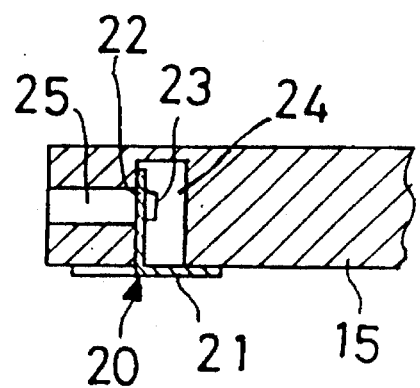
FIG. 5 is a cross-sectional view along a line A—A in FIG. 4.
Figure 6:
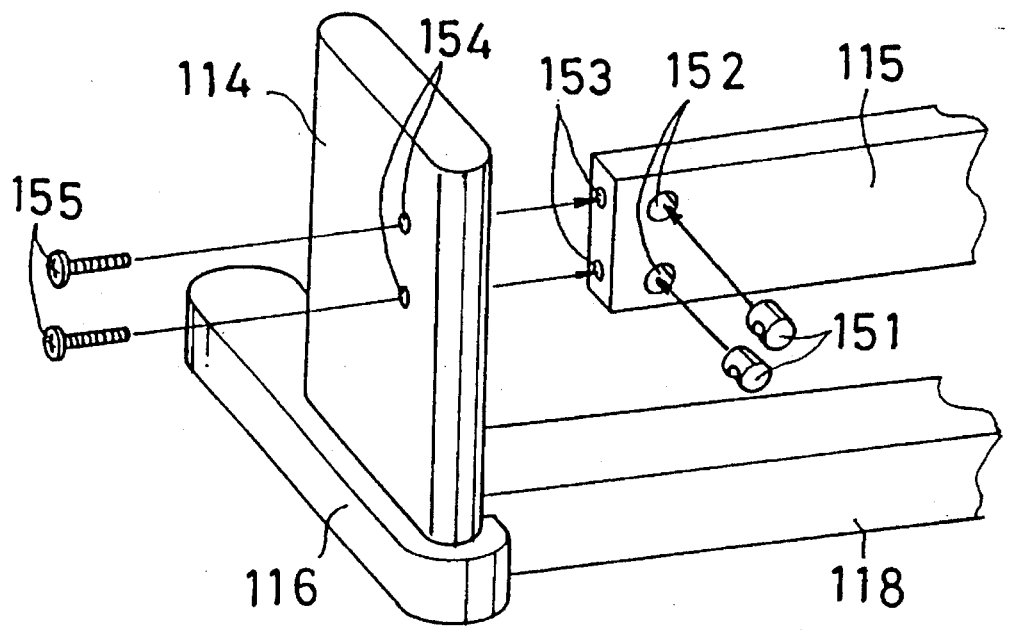
FIG. 6 is a perspective view showing one securing structure of the stand of the prior art.
Figure 7:
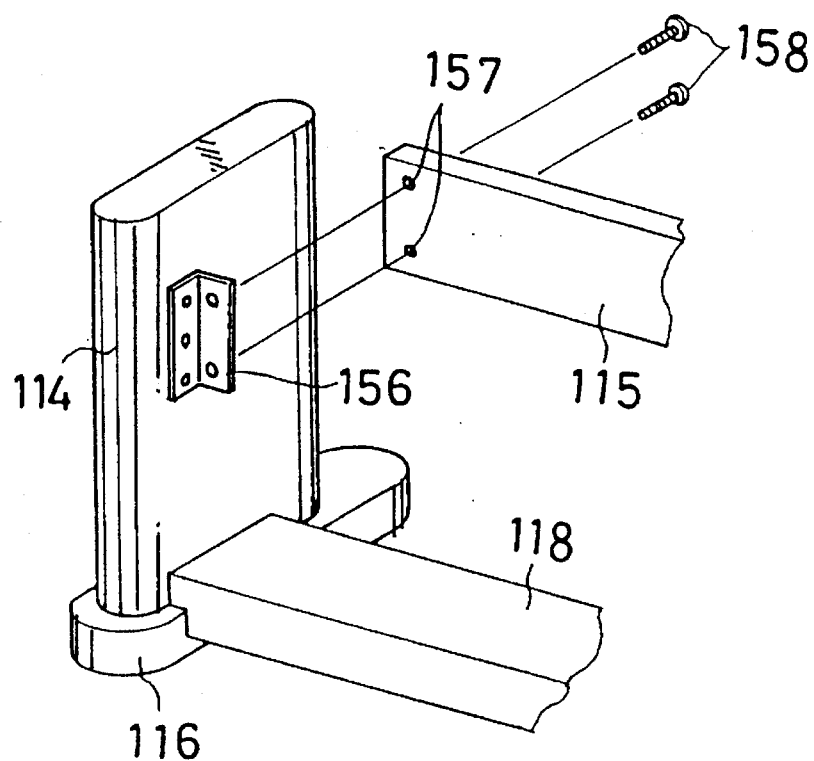
FIG. 7 is a perspective view showing other securing structure of the stand of the prior art different from that shown in FIG. 6.
Figure 8:
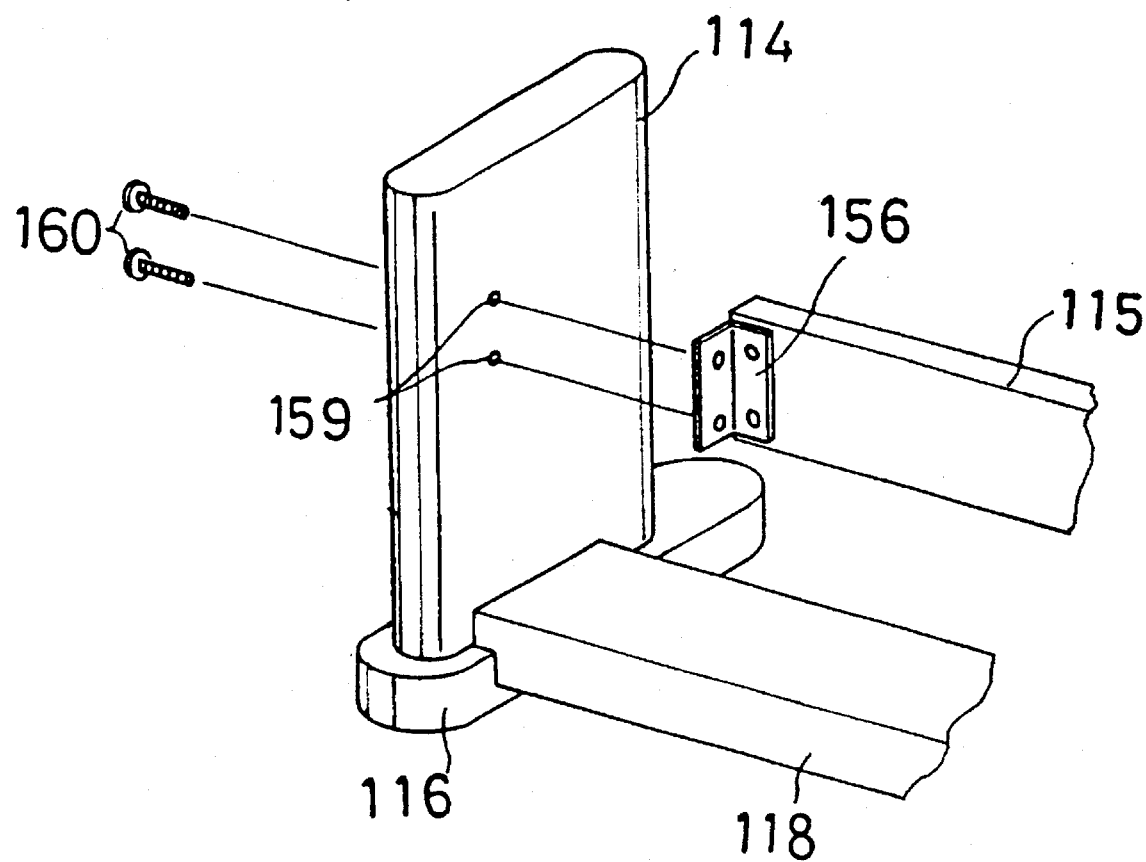
FIG. 8 is a perspective view showing other securing structure of the stand of the prior art different from those shown in FIGS. 6 and 7.

In order to secure the back plate 15 to the side plate 14, firstly the securing portion 22 of the back fitting or securing member 20 is inserted into the elongated aperture 24 of the back plate 15. This insertion is limited by the abutment of the front surface of the main body portion 21 of the back plate fitting 20 against the rear surface of the back plate 15. In this position, the internal threads 23 of the back plate fitting 20 and the insert apertures 25 are aligned with each other as shown in FIG. 5. Also in this position, the elongated apertures 24 are completely covered by the main body portion 21. Accordingly the main body portion 21 has both functions of positioning the internal threads 23 and of concealing the elongated apertures 24 of the back plate 15. The plate-like main body portion 21 can be positioned substantially flush with the rear surface of the back plate 15 when it covers the elongated apertures 24. The blind elongated apertures 24 do not appear on the front surface of the back plate 15 and can exhibit preferable aesthetic appearance.

Then as shown in FIG. 2, assembly of one end of the back plate 15 is completed by opposing one end surface of the back plate 15 to which the back plate fitting 20 has been attached to the inside surface of the side plate 14, and then aligning the insert apertures 25 of the back plate 15 with the through apertures 26 of the side plate 14, and finally inserting screws into the apertures 25 and 26 from the outside of the side plate 14 and fastening the screws 19 into them. In this case, the assembly can be very easily carried out since the internal threads 23 of the fitting 20 can be easily aligned with the insert apertures 25 by contacting the main body portion 21 with the back plate 15. In addition, the side plate 14 and the back plate 15 are firmly secured each other by sufficient friction applied between them since both the plates 14 and 15 are firmly fastened between the screws 19 and the securing portion 22 of the fitting 20 due to their urging movement toward each other.

An assembly of the other end of the back plate 15 and the other side plate 14 is carried out in a similar way described above.

The present device can be carried out in various embodiment other than that described above. Although the securing member or back plate fitting shown is formed by a substantially T-shaped plate-like fitting, any other configuration and material having the same functions may be used. In addition, although the back plate is abutted against the side plate in the embodiment shown, a reverse relation, that is, the side plate may be abutted against the back plate. Of cource, in this case, the securing member is mounted inside the side plate and it is preferable to form a notch in the side plate into which the back plate can be fitted to prevent projection of the back plate from the side plate and also to increase the strength of connection.

According to the securing structure of the stand for keyed instrument of the present invention, the back plate and side plate can be easily and firmly assembled.

What is claimed is:

1. A securing structure for a stand of a keyed instrument having a pair of side plates supporting a main body of the keyed instrument and a back plate spanned between the pair of side plates and reinforcing the pair of side plates, wherein each of the pair of side plates and the back plate are interconnected by a screw through a securing plate with each end face of the back plate being abutted directly in its entirety against a side face of one of the pair of side plates, respectively wherein:

each side plate has, at the side face thereof, a through aperture through which said screw can pass, said back plate has, at each end face thereof, an insert aperture corresponding to the through aperture and providing a guide for said screw, and at a side face thereof, a communicated aperture communicating with each said insert aperture in a substantially orthogonal direction relative to the insert aperture, said securing plate has a securing portion loosely inserted into the communicated aperture and having a threaded hole aligned with the insert aperture when said securing portion is inserted into the communicated aperture, and an abutment portion formed integrally with the securing portion and adapted to abut against the side face of said back plate for positioning the threaded hole to be in alignment with the insert aperture and concealing the communicated aperture.

2. The securing structure of claim 1 wherein the communicated aperture is an elongated slot having a principle axis substantially perpendicular to said through aperture and said insert aperture so as to permit said threaded hole to be variably located along said principle axis.

* * * * *